United States Patent Office 2,822,252
Patented Feb. 4, 1958

2,822,252
ANTIKNOCK COMPOSITIONS

James C. Boag, Detroit, and Harry R. Dittmar, Royal Oak, Mich., assignors to Ethyl Corporation, New York, N. Y., a corporation of Delaware No Drawing. Application May 31, 1955
Serial No. 512,272

7 Claims. (Cl. 44—69)

This invention relates to improved antiknock compositions. These compositions encompass antiknock fluids and leaded fuels. In particular, this invention relates to a class of nitrohalohydrocarbons having a particular molecular structure for use as a scavenger with lead antiknock compounds.

With the discovery of the antiknock effectiveness of organolead compounds, in particular alkyllead compounds such as tetraethyllead, it was found that for efficient operation of the engine, means must be provided to remove the lead-containing products of combustion. The first advance in this art was the discovery that organic halogen compounds, in particular organic chlorides and bromides, when co-present with the lead antiknock compound, reacted in the combustion chamber with the combustion products of the lead antiknock to form volatile lead halides. These lead halides during the exhaust cycle were more or less efficiently removed from the combustion chamber. This process has been called scavenging, and a material capable of so reacting with lead is referred to as a lead scavenger or, more simply, as a scavenger. Choice of a commercial scavenger to date has been based on commercial availability and cost. Thus, up to the present the only scavengers which have enjoyed any commercial success have been ethylene dibromide and ethylene dichloride. Other halogen-containing compounds proposed as scavengers are those whose can be introduced into the combustion chambers of the various cylinders of a multi-cylinder engine in the same proportionate ratio as the tetraethyllead. This can be achieved by employing scavengers which have approximately the same relative volatility in the fuel as the tetraethyllead. These scavengers are known as uniformly volatile or U. V. scavengers. As before, no consideration was given to chemical or physico-chemical properties as they affect the scavenging function.

It is, therefore, an object of this invention to provide antiknock compositions having improved scavenging properties. It is also an object of this invention to provide antiknock fluids containing improved scavengers. It is likewise an object of this invention to provide fuels containing lead antiknock agents and improved scavengers. It is a further object of this invention to provide means for operating an internal combustion engine with leaded fuels in a manner wherein the advantages of the lead antiknock are utilized to a maximum degree and the disadvantages are minimized. These and other objects of this invention will become apparent from the following description.

The above and other objects are accomplished by providing antiknock fluids and leaded fuels which contain as scavengers halonitrohydrocarbons in which the $NO_2$ groups are attached to non-aromatic carbon atoms and in which the halogens have atomic weights of 35–81, said nitrohalohydrocarbons being further characterized in that at least one halogen is attached to a non-aromatic saturated carbon atom which is not more than two carbons removed from an $NO_2$-bearing saturated carbon, that is, there should not be more than one carbon in the chain between the $NO_2$-bearing carbon and the halogen-bearing carbon. The novel scavenging agents of this invention are chloronitrohydrocarbons, bromonitrohydrocarbons and chlorobromonitrohydrocarbons and can be derived from alkanes, cycloalkanes, alkenes, cycloalkenes and various hydrocarbon-substituted derivatives thereof. As stated above, at least one halogen must be on either the carbon atom to which the $NO_2$ group is attached or on a saturated carbon which is not more than two carbons removed from the non-aromatic $NO_2$-bearing carbon. By "saturated carbon" is meant a carbon atom which is bonded by single bonds to four other atoms. The lowest hydrocarbon radical which can provide a scavenger of this invention contains two carbon atoms, as, for example, 1-halo-1-nitroethane. In order to provide scavengers having the proper inductibility characteristics with respect to induction into the combustion chamber of a spark ignition engine through the fuel lines of conventional commercial engines, we employ halonitrohydrocarbon scavengers having from 2 to 20 carbon atoms, 1 to 3 $NO_2$ groups and 1 to 6 halogens per molecule. A preferred embodiment of our invention comprises halonitrohydrocarbon compounds as scavengers having from 2 to 12 carbon atoms, 1 to 3 $NO_2$ groups and 1 to 4 halogens. In the scavengers of this invention the ratio of halogen-to-$NO_2$ groups can vary from 1:3 to 6:1, the requirement being that at least one of the halogens is on a carbon atom which is not more than two carbons removed from an $NO_2$-bearing carbon.

Thus, in general our invention comprises providing organolead antiknock fluids and fuels containing halogenated organic scavenger compounds wherein at least one mole percent of halogen in the scavenger is present in the form of nitrohalohydrocarbon compounds having from 2 to 20 carbon atoms, 1 to 3 $NO_2$ groups and 1 to 6 halogens in which the nitro groups are attached to non-aromatic carbon atoms and in which the halogens have atomic weights of 35–81, said nitrohalohydrocarbons being further characterized in that at least one halogen is attached to a non-aromatic carbon atom which is not more than two carbons removed from an $NO_2$-bearing saturated carbon atom.

A preferred embodiment of our invention comprises providing organolead and hydrocarbolead antiknock fluids and fuels containing halogenated organic compounds as scavengers wherein at least one mole percent of halogen in the scavenger is present in the form of nitrohalohydrocarbon compounds of the type described hereinabove having 2 to 12 carbon atoms, as these are the compounds that are found to be more readily inductible and have the required volatility characteristics for proper distribution among the various cylinders in a multi-cylinder engine.

It is believed that scavengers decompose or burn in the combustion process and release free hydrogen halides which react with the lead deposit-forming compounds in the combustion chamber to produce volatile compounds of lead which are carried away with the exhaust gases. It has been found that when nitrohalohydrocarbon compounds of this invention are employed for scavenging purposes, they are much more effective in removing deposits than are conventional scavengers. The reason for this is not known but it is believed that the nitro group has an activating effect on the release of halogen, the active component, causing the latter to be produced at a time more advantageous to efficient deposit scavenging than is the case when conventional scavengers such as ethylene dibromide and ethylene dichloride are employed. Consequently, the compounds of this invention are found to be as much as 131 percent as effective as conventional scavengers in removing deposits from exhaust valves. As a result thereof much smaller amounts of the scavenger can be employed to obtain the same or higher scavenging efficiency. Besides the economical advantage that this provides, an additional advantage is that when smaller proportions of halogen-containing compounds are used there is considerable reduction in the amount of corrosion of the engine parts in the combustion chamber which results in longer exhaust valve life. It is also found that spark plug fouling is considerably reduced when the scavengers of this invention are employed in lead-containing fuels.

The scavenger composition of our new antiknock fluid mixtures can be described in terms of theories of halogen. A theory of halogen is defined as the amount of halogen which is necessary to react completely with the lead present in the antiknock mixture to convert it to lead dihalide. In other words, one theory represents two atoms of halogen for every atom of lead present.

The outstanding properties and unexpected advantages of our scavengers can be graphically illustrated by the following statement of results: A single cylinder CFR L-head test engine was operated at 900 R. P. M. on a fuel-to-air ratio of 0.082, on an isooctane fuel containing 13.2 grams of lead as tetraethyllead per gallon and 0.75 theory of chlorine as 1,1-dichloro-1-nitropropane, one of the scavengers of this invention. The amount of deposit on the exhaust valve was only 36 percent as compared with the amount of deposit formed when the engine was operated on the same fuel for an equal length of time with no scavenger present. That is, the amount of deposit removal was 64 percent. When a similar run was made with 0.75 theory of bromine as ethylene dibromide, a conventional scavenger, only 50 percent deposit removal was obtained as compared with the fuel containing lead but no scavenger. The relative effectiveness in deposit removal of our scavenger as compared to the conventional scavenger was therefore 128 percent. Still higher deposit removal effectiveness is displayed per unit amount of halogen by such compounds as 1-bromo-2-nitropropane, 1-chloro-2-nitroethane, 9-chloro-10-nitrooctadecane, etc.

In order to determine the effect of our new scavengers on exhaust valve life, a single cylinder test engine having a combustion chamber displacement of 17.6 cubic inches and a compression ratio of 5.6:1 is operated at 2700 R. P. M. on a fuel-to-air ratio of 0.07, using a commercial fuel containing 0.05 percent sulfur and 3 ml. of tetraethyllead per gallon together with various halogen compounds as scavengers. When the scavenger is composed of 0.5 theory of bromine as 1,1-dibromo-1-nitroethane and 1.0 theory of chlorine as ethylene dichloride, the average number of hours of operation of the engine until the exhaust valve fails due to burning is considerably greater than when equivalent amounts of bromine and chlorine are employed in the form of ethylene dibromide and ethylene dichloride. Thus, it is seen that replacing part of the halogen in a scavenger mixture consisting of ethylene dihalides with an equivalent amount of halogen in the form of one of the compounds of this invention results in a substantial increase in valve life.

The nitrohalohydrocarbon compounds employed as scavengers according to this invention fall into two categories; one consisting of compounds having 2 to 20 carbon atoms which constitutes the broad class of compounds of this invention, while the other category is the preferred class of compounds and comprises those having from 2 to about 12 carbon atoms in the molecule. Some non-limiting examples of the scavengers are as follows:

Typical nitrohalohydrocarbon compounds used as scavengers are 1-bromo-1-nitroethane; 1-chloro-1-nitroethane; 1,1-dibromo-1-nitroethane; 1-bromo-1-chloro-1-nitroethane; 1-bromo-2-nitroethane; 1,1-dichloro-2-nitroethane; 1,2-dibromo-1-nitroethane; 1-bromo-1-nitropropane; 2-chloro-1-nitropropane; 3-bromo-1-nitropropane; 2,3-dichloro-1-nitropropane; 1-bromo-3-chloro-1-nitropropane; 1,3-dibromo-2-nitropropane; 2-bromo-2-nitropropane; 1-chloro-2-methyl-2-nitropropane; 3-bromo-2-nitrobutane; 1-bromo-1-nitropentane; 1,1,3,4-tetrabromo-2-nitropentane; 2,4,4,5-tetrachloro-3-nitrohexane; 1-bromo-1-nitro-2,4,4-trimethylpentane; 1-bromo-2-nitro-3-phenylpropane; 3-chloro-1-nitrododecane; which constitute compounds having up to 12 carbon atoms and fall within the preferred group of compounds used as scavengers according to this invention. Examples of scavengers having up to 20 carbon atoms are 5-bromo-3,5,7-trinitro-2,2,4,4,6,6-hexamethyloctane; 2,3,6,11-tetrachloro-1,5,9-trinitrohexadecane; 2-chloro-1-nitrooctadecane; 1,1,1,3,5,6-hexabromo-7-nitroeicosane, and the like.

Typical nitrohalohydrocarbon scavengers of this invention which possess carbon-to-carbon unsaturation are 4-bromo-4-nitrobutene-1; 3,5,5-tribromo-4-nitropentene-1; 5-bromo-5-nitropentene-1; 5-bromo-5-nitro-2,4-dimethylpentene-1; 1-nitro-3-chlorododecene-5; which fall within the group having 2 to 12 carbon atoms; and 4-bromo-6-nitro-3,5,5,7-tetramethyldecene-1; 3,6,11,13-tetrabromo-5,9-dinitrohexadecene-1; 2-chloro-1-nitroeicosene-3; and the like, which represent compounds having up to 20 carbon atoms.

Non-limiting examples of nitrohalocycloaliphatic hydrocarbons used as scavengers according to this invention are 1-chloro-2-nitrocyclopropane; 1-bromo-1-nitrocyclobutane; 1-chloro-1-nitrocyclopentane; 2,6-dibromo-1-nitrocyclohexane; 1-nitro-3-chloro-2,5-dimethylcyclopentane; 1-nitro-3,7-dichlorocyclohexane; 1,5-dinitro-2,6-dibromocyclooctane; 1-chloro-2-nitro-5-phenylcyclohexane, comprising compounds falling into the group having 2 to 12 carbon atoms; and 1-cyclohexyl-2-(3-bromo-3-nitrocyclohexyl)ethane; 2-bromo-2-nitro-4-phenyl-1-(2,4-dichloro-3-nitrocyclohexyl)butane; 1-nitro-2-(phenylbromomethyl)-5-benzylcyclohexane, which illustrate scavengers having up to 20 carbon atoms.

Illustrative examples of nitrohalocycloalkene compounds are 1-bromo-1-nitrocyclobutene-2; 1-chloro-1-nitrocyclopentene-2; 1-nitro-2,6-dibromocyclohexene-3; 1-nitro-3-chloro-2,5-dimethylcyclopentene-4; 1-nitro-2-chloro-4-phenylcyclohexene-5, which represent compounds having up to 12 carbon atoms; and 1-(3-bromo-3-nitrocyclohexyl)-2-cyclohexylethylene; 1-(2,2-dichloro-3-nitrocyclohexyl)-6-phenylhexene-2, and the like which represent compounds having up to 20 carbon atoms.

The halonitrohydrocarbons used herein as scavenging agents can be made by methods well known to those skilled in the art as, for example, the addition of nitryl chloride, $NO_2Cl$, to olefins to produce chloronitrohydrocarbons in which the $NO_2$ group and the chlorine are on adjacent non-aromatic carbon atoms. Halonitrohydrocarbons in which the halogen and nitro groups are attached to the same carbon atom are formed by halogenating the sodium salts of the nitrohydrocarbons. Thus, chlorination of the sodium salt of nitroethane produces 1-chloro-1-nitroethane and 1,1-dichloro-1-nitroethane. Halohydrocarbons in which the $NO_2$-bearing carbon and the halogen-bearing carbon atoms are separated by one carbon atom can be made by halogenating nitrohydrocarbons under substantially anhydrous conditions in the presence of strong light. For example, bromination of 1-nitropropane in the presence of $P_2O_5$ produces 3-bromo-1-nitropropane and also 2-bromo-1-nitropropane. Still other methods of synthesis will be apparent to those skilled in the art.

It has been found that the scavengers of this invention can be used in several different formulation or blend types. Principal among these are: (a) blends or fluids in which our scavengers are the sole scavenging agents, (b) fluids in which the scavengers are added to conventional antiknock fluids to supplement the scavengers therein, and (c) those in which the scavengers replace a portion of the scavenger in a conventional antiknock fluid.

In general, our scavengers can be employed together with any other scavenging agent or mixture of two or more of them. For example, the halonitrohydrocarbon of this invention can be added to organolead antiknock fluids containing 0.5 theory of bromine as ethylene dibromide and 1.0 theory of chlorine as ethylene dichloride or any combination of theories of these two components as, for example, those described in U. S. Patent 2,398,281. The halonitrohydrocarbon can also be employed with one theory of bromine as ethylene dibromide or amounts of the latter either greater or less than one theory. Other scavenger compositions that can be employed together with the new scavengers of this invention are those having a vapor pressure of substantially 0.2 to 6 mm. of mercury at 50° C. as, for example, the compositions described in U. S. Patents 2,479,900; 2,479,901; and 2,479,903. Our scavenging agents can likewise be used with compositions of the kind described in U. S. Patents 2,364,921; 2,479,902; 2,490,606; 2,496,983, etc. It is not intended that mixed scavengers in the fluids and fuels of this invention be limited to mixtures of our new scavenger with the above-mentioned conventional scavengers, but they may be employed together with any hydrocarbon fuel-soluble organic halide scavenger compounds consisting of carbon and elements selected from the groups consisting of bromine, chlorine, hydrogen, nitrogen, and oxygen. In addition, our scavengers can be employed with deposit modifying compounds not containing halogens; for example, organophosphorus compounds and the like. In any event a halohydrocarbon scavenger of this invention is always present so that the amount of halogen which it provides represents at least one mole percent of total halogen in the scavenger mixture.

In general, good results are obtained when the antiknock mixtures are so composed that the amount of halogen present ranges between 0.1 and 4.0 theories. This includes not only the amount of new scavenger but also the amount of prior art scavenger, if any, so that the above range applies to the total amount of halogen present in the antiknock fluid. For most outstanding results, we prefer that the total amount of halogen be between 0.15 and 2.0 theories, as at least 0.15 theories should be present to give best results, while not much additional scavenging benefit is obtained when more than 2.0 total theories are used.

Referring to the three principal blend types listed above, when we use type (a) in which our scavengers are the sole scavenging agents, we prefer to use between 0.1 and 3.0 theories of halogen. For the greatest benefit, we use nitrochlorohydrocarbons to the extent of 0.3 to 3.0 theories and nitrobromohydrocarbons in amount between 0.15 and 1.5 theories. When a mixture of the chloride and bromide is used the amount of each will vary according to a relationship which will be shown below.

When we employ either fluid type (b), a fluid in which our new scavengers are added to conventional antiknock fluids to supplement the scavengers therein, or fluid type (c), one in which our scavengers replace a portion of the scavenger in a conventional antiknock fluid, we adjust the amounts of scavenger compounds so that the total halogen is from 0.1 to 4.0 theories, preferably 0.3 to 3.0 theories, and the portion of this which is in the form of our novel scavenger ranges between 0.5 and 2.0 theories.

It has been found that the relative scavenging effectiveness of bromine-containing compounds and chlorine-containing compounds vary depending on the engine operating conditions. Thus, under light load operations as in passenger car service when engine surface temperatures are low, the scavenging efficiency of chlorine-containing compounds is much lower than that of similar bromine-containing compounds. On the other hand, when the engine temperature is relatively high, as is the case in heavy-duty truck operation, the scavenging effectiveness of chlorine in the form of a chlorine-containing compound is considerably higher than under low temperature conditions while the bromine-containing compounds show a trend in the opposite direction. Taking an over-all average over varying engine operating conditions, it may be said that chlorine in the form of a chlorine-containing compound is approximately one-half as effective in removing deposits from exhaust valves and spark plugs as an equivalent number of theories of bromine in the form of a similar bromine-containing compound. Accordingly, a convenient method for expressing the total number of theories of halogen in a lead-containing antiknock fluid or fuel is in terms of the scavenging effectiveness of bromine. For example, since a chlorine-containing compound is on the average only about one-half as effective a scavenger as a similar bromine-containing compound, it will require about twice as many equivalents of the chloro compound to obtain the same deposit removing effect as of a given amount of a bromine compound. In this regard, it should be pointed out that we use the upper limit of 40 theories of scavenger when employing only chlorine-containing scavengers, since the same amount of effectiveness is obtained with 2.0 theories of bromine and, by the same token, we use the lower limit of 0.1 theory of scavenger when a bromine-containing scavenger is the sole scavenging constituent, since for an equivalent scavenging effectiveness 0.2 theory of chlorine is required. Thus, if X is the number of theories in terms of bromine effectiveness required in a scavenging composition, it is convenient to determine the make-up of a desired fluid with respect to the proportions of chlorine scavenger and bromine scavenger by use of the equation $$\tfrac{1}{2} T_{Cl} + T_{Br} = X$$

In this equation $T_{Cl}$ represents the number of theories of chlorine and $T_{Br}$ represents the number of theories of bromine. The limits set for X correspond to the total bromine scavenging effectiveness desired. Therefore, X can range between 0.1 and 2.0 theories. To determine the composition of a fluid by means of this equation, therefore, we first select the total number of theories of halogen in terms of bromine scavenging effectiveness desired and substitute this number for X in the equation. Then we select the number of theories of either chlorine or bromine which we wish to use. The equation is next solved for the remaining unknown. By this method, the composition of the fluid is determined in so far as the scavenger is concerned.

To illustrate, for example, suppose that it is desired to make up a fluid whose effectiveness in terms of bromine scavenger is equal to 1.5 theories and suppose further that it is desired to use 1.2 theories of chlorine scavenger in this fluid. Placing these numbers in the above equation there is obtained the expression $\tfrac{1}{2}(1.2) + T_{Br} = 1.5$. Solving this equation for $T_{Br}$ it is found that 0.9 theory of bromine scavenger should be used.

The values of X in the above equation can vary from 0.1 to 2.0. Therefore, the equation holds true for values of $T_{Cl}$ ranging from zero to 4.0, while the values of $T_{Br}$ changes from 2.0 to zero. When the new scavengers of this invention are the sole scavenging agents, the preferred range of values for X is 0.1 to 1.5 and the equation will then embody the range of values of the theories of halogen between the upper and lower limits that can be used as stated hereinabove.

The use of the novel scavengers of this invention either alone or in combination with other scavengers possesses a number of advantages in addition to those mentioned above. One advantage is that by using the scavengers of the instant invention the scavenging effect of conventional scavengers can be obtained with a lower concentration of halogen based on the lead present. For example, the scavenger mixture consisting of one theory of chlorine as ethylene dichloride plus 0.35 theory of bromine as 1-bromo-2-nitroethane has essentially the same scavenging effect as a mixture which is made up of 1.0 theory of chlorine as ethylene dichloride and 0.5 theory of bromine as ethylene dibromide. This in turn reduces the corrosion effects due to hydrohalic acids on various engine parts, such as cylinder walls, intake and exhaust valves, mufflers, etc. On the other hand, when a combination of conventional scavengers and the scavengers of the instant invention are employed in an amount such that the concentration of halogen is equivalent to that commercially in use at present, an increased scavenging effect is obtained. An illustration of this is the substitution of a small amount of a nitro-halohydrocarbon for the halogen compound of a conventional antiknock fluid to give, for example, an antiknock fluid which contains as scavengers 1.0 theory of chlorine as ethylene dichloride, 0.4 theory of bromine as ethylene dibromide and 0.1 theory of bromine as 1-bromo-1-nitropropane. This antiknock fluid when employed in gasoline in a spark ignition engine shows a marked improvement in scavenging effect over a mixture in which equivalent amounts of bromine and chlorine are present as ethylene dihalides. It can readily be seen that by taking advantage of these various benefits a great deal of flexibility can be achieved in tailormaking fluids to meet any requirement.

In blending the antiknock fluids with fuels we regulate the amount of antiknock fluid so that the amount of lead present in the fuel varies between 0.02 and 13.2 grams per gallon. It is to be understood that we may obtain the finished fuels by blending the various ingredients of our antiknock fluids separately or in any subcombination with the fuels as well as blending the finished antiknock fluids with the fuels.

The following examples illustrate various antiknock fluids of this invention.

*Example I*

Ninety-eight parts (1.0 theory) of ethylene dichloride and 154 parts (0.5 theory) of 1-bromo-2-nitroethane are admixed with efficient stirring with 323 parts of tetraethyllead. This gives an antiknock fluid in which the conventional fluid commonly known as 62 Mix has been supplemented by one of the new scavengers.

To obtain a finished fuel, the above described fluid is blended with gasoline so that the amount of lead present is 0.5 gram per gallon. Use of this fuel in a single cylinder test engine results in a smaller amount of deposits in the combustion chamber than when equivalent amounts of bromine and chlorine are employed in the form of the ethylene dihalides.

*Example II*

To 323 parts of tetraethyllead is added with good stirring 98 parts (1.0 theory) of ethylene dichloride, 75 parts (0.4 theory) of ethylene dibromide, and 123 parts (0.5 theory) of 1,1-dibromo-1-nitropropane.

To obtain a finished fuel, the above fluid is blended with gasoline so that it is evenly distributed throughout the gasoline and so that the amount of lead present in the gasoline is 7.5 grams per gallon. A very high scavenging efficiency is observed when this fuel is used in the operation of a single cylinder aviation-type engine.

*Example III*

To 379 parts of tetrapropyllead is added 33.6 parts (0.1 theory) of 1-bromo-1-nitropropane.

This is blended with gasoline in relative amounts so that the finished fuel contains 3.16 grams of lead per gallon. When this fuel is employed in the operation of a spark-fired internal combustion engine, it is found that the deposit scavenging effect of the 1-bromo-1-nitropropane is much higher than of an equivalent amount of bromine in the form of a primary halide.

Valuable antiknock fluids are also obtained when Example III is repeated with the amounts varying so that the amount of bromine as scavenger is as high as 1.5 theories. For best results it is preferred to blend so that when a chloro-nitrohydrocarbon is used, the amount ranges between 0.3 and 3.0 theories, and so that when a bromo-nitrohydrocarbon is used, the amount of scavenger varies between 0.15 and 1.5 theories. Examples of fluid compositions of this type are: a mixture of 323 parts of tetraethyllead and 50 parts (0.15 theory) of 1-bromo-3-nitropropane; a fluid containing 323 parts of tetraethyllead to 325 parts (1.5 theories) of 2-nitro-1,1,3,4-tetrabromopentane; a composition which contains 323 parts of tetraethyllead and 91 parts (0.3 theory) of 3-chloro-3-nitropentane; and a mixture of 323 parts of tetraethyllead and 1075 parts (3.0 theories) of 2-chloro-3-nitro-2-methylhexane. Each of these fluid compositions are blended with hydrocarbon fuels as indicated above to make up a finished fuel.

*Example IV*

To 254 parts of toluene as a solvent containing a blue dye are added 5 parts of 2,6-di-t-butyl-4-methylphenol, 323 parts of tetraethyllead, 108 parts (0.35 theory) of 1-bromo-1-nitroethane and 247 parts (1.0 theory) of 1-chloro-3-nitropropane. This provides an antiknock fluid wherein the new scavengers comprise the only scavengers present and wherein the total amount of halogen is 1.35 theory.

This fluid is admixed with gasoline so that the total amount of lead present, which is uniformly distributed throughout the fuel, is 4.22 grams per gallon. When operating road vehicles, it is found that the use of this fuel results in longer valve and spark plug life as well as a lower amount of deposit in the combustion chamber than when an equivalent amount of halogens is employed in the form of conventional scavengers.

We also make blends which consist of tetraethyllead plus two bromo compounds, tetraethyllead plus two chloro compounds, and tetraethyllead plus a chlorine compound and a bromine compound different from those above as, for example, tetraethyllead with 0.3 theory of bromine as 1-bromo-2-nitro-3-phenylpropane and 0.35 theory of bromine as 1-bromo-1-nitrocyclopentane; and tetraethyllead with 0.9 theory of chlorine as 1-nitro-3-chlorododecane and 0.55 theory of chlorine as 1-chloro-2-nitro-2,3,3-trimethylbutane.

*Example V*

To 323 parts of tetraethyllead is added 188 parts (one theory) of ethylene dibromide and 39 parts (0.1 theory) of 1-nitro-2-bromo-3-methylbutane. This composition provides an antiknock fluid wherein the scavengers comprise in part a compound of this invention and the scavenger used in 1-T Mix. The total amount of scavenger is equivalent to 1.1 theories of bromine based on the amount of lead present.

The above fluid is added to gasoline with appropriate agitation so that when uniformly distributed throughout the fuel the concentration of the fluid is equivalent to 2.0 grams of lead per gallon of fuel. The deposit scavenging effect of this scavenger mixture, when the fuel is employed in a commercial multi-cylinder engine, is greater than when an equivalent amount of bromine is made use of in the form of ethylene dibromide.

In like manner, fluids and fuels are prepared containing tetraethyllead together with the scavengers mentioned above in this example. A variation of the scavenger mix used herein is to combine 1 to 0.1 theory of bromine as ethylene dibromide with from 0.05 to 1.0 theory of halogen as a nitrohalohydrocarbon as, for example, a fluid containing 323 parts of tetraethyllead, 188 parts (1.0 theory) of ethylene dibromide, 1.9 parts (0.05 theory) of 1-bromo-1-nitropentane, and gasoline containing 224 parts (0.5 theory) of 1-bromo-2-nitroheptane, 188 parts (0.1 theory) of ethylene dibromide for every 323 parts of tetraethyllead.

*Example VI*

To 323 parts of tetraethyllead is added 25 parts (0.05 theory) of 2-bromo-3-nitro-4-ethylheptene-1 and 437 parts (2.90 theory) of 4-chloro-1-(β-chloroethyl) benzene. This provides an antiknock fluid wherein a scavenger of this invention is employed together with a UV scavenger of the type embodied in U. S. 2,479,901 of which the latter is a monohaloalkyl benzene compound having 8 carbon atoms with a chlorine attached to the benzene ring and having a vapor pressure in the range of from 0.2 to 6.0 mm. of mercury at 50° C.

This antiknock fluid is mixed with gasoline in proportions to give a concentration of 0.02 gram of lead per gallon of the fuel. We also make blends of fluids and fuels containing tetraethyllead and a mixture of the uniformly volatile scavengers together with compounds of this invention. Examples of these are tetraethyllead plus 2.0 theory of chlorine as 1-nitro-2,5-dichlorocyclohexene-3 and 2.0 theory of mixed dichloroxylenes; 0.05 theory of bromine as 2-bromo-4-phenyl-1-nitrocyclohexane and 1.0 theory of bromine as 2-bromo-1,3-dimethylbenzene with lead tetraethyl, and the like. Fuels containing these scavenger mixes when used in engines result in improved operating characteristics.

*Example VII*

To 323 parts of tetraethyllead is added 62 parts (0.25 theory) of 1-nitro-2,3-dibromopropane and 62.5 parts (0.25 theory) of 2-bromoethanol-1. This mixture is thoroughly agitated to insure even distribution of the scavenger in the tetraethyllead fluid. The fluid is then blended with a hydrocarbon fuel of the gasoline boiling range in amount such as to give a concentration of 4.0 grams of lead per gallon of fuel.

Fluid and fuel compositions are also made up in which the scavenger content is composed of compositions, such as 0.1 theory of bromine as 2,5-dibromo-2,5-dimethylhexane; 0.15 theory of bromine as tert-butylbromide; 0.1 theory of chlorine as 3,5-dichloroheptane; 0.5 theory of bromine as diethyldibromomalonate and 0.15 theory of bromine as 1-bromo-1-phenyl-2-nitroethane. Mixtures of any combination of two or more of these scavengers can also be used with better results in scavenging effectiveness being achieved than when the compounds of this invention are not included.

In addition to the benefits given hereinabove upon employing the deposit scavenging compounds of this invention, it is also found that the use of many of these scavengers minimizes the octane requirement increase of engines operated on commercial fuels. This increase in octane requirement is a phenomenon observed as the time of operation of an engine is lengthened. It is due to deposits which are built up in various parts of the combustion chamber with the result that a fuel of a quality higher by several octane numbers is required to provide a performance equivalent to that of a clean engine or combustion zone. The nitro-halohydrocarbon scavengers of this invention minimize this octane requirement increase.

The scavengers of this invention may be used with organolead or hydrocarbolead compounds in general. Examples of such compounds, including tetralkyllead and alkylaryllead compounds other than tetraethyllead, are tetrapropyllead, dimethyldiethyllead, methyltriethyllead, diethyldiphenyllead, tetrabutyllead, and the like, as well as mixtures of these compounds. The amount of lead compounds employed will vary from about 0.02 to 13.2 grams of lead per gallon, depending on the engine it is to be used in and the kind of fuel employed.

The antiknock composition of this invention may contain other components besides lead antiknock compounds and the nitrohalohydrocarbon compounds as scavengers. Such other components may be solvent, such as toluene or kerosene, or other hydrocarbons. They may also contain dyes which are often used for purposes of identification of fluids. Likewise, antioxidants, such as alkylated phenols and amines, metal deactivators, phosphorus compounds; other antiknock agents, such as amines and metal carbonyls, antitrust and anti-icing agents, and wear inhibitors, may also be added to the antiknock compositions or fuel containing the same. In like manner, the fuels to which the antiknock compositions of this invention are added may have a wide variation of composition. These fuels generally are petroleum hydrocarbons and are usually blends of two or more components. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically cracked, reformed fractions, etc. The boiling range of the components of the gasoline can vary from 0 to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

The hydrocarbon fuels in which the antiknock agent of this invention can be employed often contain minor quantities of various impurities. One such impurity is sulfur, which can be present either in a combined form as an organic or inorganic compound or as the elemental sulfur. The amounts of such sulfur can vary in various fuels from about 0.003 percent to about 0.30 percent by weight. Fuels containing quantity of sulfur, both lesser and greater than the range of amounts referred to above, are also known. These fuels also often contain added chemicals in the nature of antioxidants, rust inhibitors, dyes, and the like.

Having fully described the nature of the improved antiknock fluids and fuels obtained according to this invention, it is not intended that this invention be limited except within the scope of the appended claims.

We claim:

1. An organolead antiknock fluid having as its principal antiknock ingredient an organolead compound and containing a halogenated organic compound scavenger wherein at least one mole percent of halogen in the scavenger is present in the form of halonitrohydrocarbon compounds having 2 to 20 carbon atoms, 1 to 6 halogens and 1 to 3 $NO_2$ groups in which the $NO_2$ groups are attached to non-aromatic carbon atoms and in which the halogens are of atomic weight 35-81, said nitrohalohydrocarbon being further characterized in that at least one halogen is attached to a non-aromatic carbon atom which is not more than two carbons removed from an $NO_2$-bearing carbon; the total amount of said halogenated organic compound scavenger being in the range of 0.1–4.0 theories based on the amount of organolead compound present and the total amount of said halonitro hydrocarbon being in the range of 0.05–3.0 theories based on the amount of organolead compound present; a theory being that amount of scavenger which provides 2 atoms of halogen for every lead atom present in said fluid.

2. The composition of claim 1 wherein said halonitrohydrocarbon scavenger is a bromonitrohydrocarbon having 2 to 12 carbon atoms.

3. The composition of claim 1 wherein said halonitrohydrocarbon scavenger is 1-bromo-2-nitroethane.

4. A tetraethyllead antiknock fluid having as its principal antiknock ingredient tetraethyllead and containing as scavengers 0.5 theory of bromine as 1-bromo-2-nitroethane and 1.0 theory of chlorine as ethylene dichloride; a theory being that amount of scavenger which provides two atoms of halogen for every lead atom present in said fluid.

5. A petroleum hydrocarbon fuel of the gasoline boiling range containing the composition of claim 1 in amount such that the lead content is between about 0.02 and 13.2 grams of lead per gallon of fuel.

6. A petroleum hydrocarbon fuel of the gasoline boiling range containing the composition of claim 1 in amount such that the lead content is between about 0.02 and 13.2 grams of lead per gallon of fuel and wherein the halonitrohydrocarbon compound is a bromonitrohydrocarbon having 2 to 12 carbon atoms.

7. A petroleum hydrocarbon fuel of the gasoline boiling range containing the fluid composition of claim 4.

References Cited in the file of this patent

UNITED STATES PATENTS

| | | |
|---|---|---|
| 1,925,048 | Hennen | Aug. 29, 1933 |
| 2,392,610 | Noland et al. | Jan. 8, 1946 |
| 2,592,435 | Lacomble | Apr. 8, 1952 |

UNITED STATES PATENT OFFICE

CERTIFICATE OF CORRECTION

Patent No. 2,822,252                      February 4, 1958

James C. Boag et al.

It is hereby certified that error appears in the printed specification of the above numbered patent requiring correction and that the said Letters Patent should read as corrected below.

Column 5, line 65, for "0.5" read --0.05--; column 6, line 22, for "40," read --4.0--.

Signed and sealed this 7th day of October 1958.

(SEAL)
Attest:

KARL H. AXLINE                      ROBERT C. WATSON

Attesting Officer                  Commissioner of Patents